T. R. KILKENNY.

CLASP.

APPLICATION FILED NOV. 8, 1917.

Reissued Feb. 26, 1918. 14,437.

Inventor

Thomas R. Kilkenny

By

Howard E. Barlow

Attorney

UNITED STATES PATENT OFFICE.

THOMAS R. KILKENNY, OF NORTH PROVIDENCE, RHODE ISLAND, ASSIGNOR, BY MESNE ASSIGNMENTS, TO THE FIRM OF H. N. PERVEAR CO., OF PROVIDENCE, RHODE ISLAND, A COPARTNERSHIP COMPRISING THOMAS R. KILKENNY, OF NORTH PROVIDENCE, RHODE ISLAND, AND HILARY W. KILKENNY, OF SCHENECTADY, NEW YORK.

CLASP.

14,437. Specification of Reissued Letters Patent. Reissued Feb. 26, 1918.

Original No. 1,214,794, dated February 6, 1917, Serial No. 120,605, filed September 18, 1916. Application for reissue filed November 8, 1917. Serial No. 200,876.

*To all whom it may concern:*

Be it known that I, THOMAS R. KILKENNY, a citizen of the United States, residing at the town of North Providence, in the State of Rhode Island, have invented certain new and useful Improvements in Clasps, of which the following is a specification, reference being had therein to the accompanying drawing.

This invention relates to improvements in clasps employed more particularly as a lingerie clasp for women's wear, and the object of this invention is to provide a clasp comprising a strip of metal folded endwise upon itself forming two opposing arms, the ends of said arms being adapted to snap one over the other for releasably securing them together and to provide a chamber on one or both of said arms for carrying a scented medium such as perfumed cotton or the like.

With these and other objects in view, the invention consists of certain novel features of construction, as will be more fully described, and particularly pointed out in the appended claims.

Figure 1:
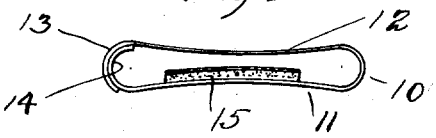

In the accompanying drawings:

Figure 1— is an edge view of my improved clasp showing in section the perfume medium-carrying chamber.

Figure 2:
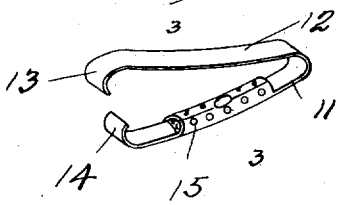

Fig. 2— is a perspective view of the clasp in open position showing the chamber located on the inner side of one of the arms.

Figure 3:
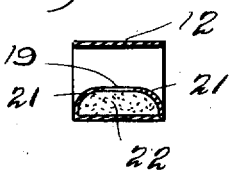

Fig. 3— is a section on line 3—3 of Fig. 2 showing the chamber as formed by turning the side edges of the arm inwardly.

Figure 4:
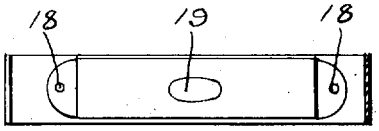

Fig. 4— is a plan view of the arm carrying the perfume chamber showing the same as connected to the arm by rivets.

Figure 5:
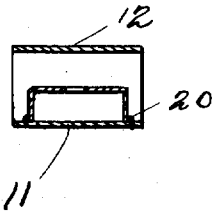

Fig. 5— is a transverse section through the arms showing a chamber member as formed separate and attached to one of the arms by solder.

Figure 6:
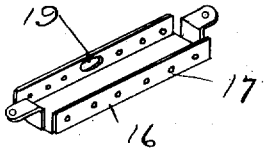

Fig. 6— is a perspective view showing the chamber member in detail.

My improved clasp is formed of a strip of metal folded upon itself at 10 forming two opposing arms 11 and 12 with their free ends 13 and 14 turned inwardly in substantially a hook-shape, whereby one will snap over the other for releasably securing these ends together. My invention consists essentially in the forming of a chambered portion 15 preferably on the inner face of one of these arms. One means of forming this chamber is by making up a trough-shaped member preferably of rectangular form as illustrated in Fig. 6 with side walls 16 perforated as at 17 to permit the odor or perfume from the scented filling to readily escape therefrom.

An opening 19 may be formed either in the top or side walls of this chamber for the purpose of permitting the filling of scented cotton or other material to be readily inserted therein.

This chamber member which is formed separate from the clasp may be secured to the clasp in any suitable manner, either on the inside or outside of one or both of said arms, and that by solder as at 20 as illustrated in Fig. 5 or by rivets 18 as illustrated in Fig. 4 or other suitable means.

I do not wish to limit myself, however, to the forming of this chamber separate and independent of the arms of the clasp, as the same may be formed integral with one or both of these arms if desired by providing wings or extending portions 21 on the side edges of the arms and then folding these wings over inwardly as illustrated in Fig. 3, thereby providing a chamber 22 into which the scented filling may be passed.

I have shown and described two constructions by which a chamber may be formed and connected to an arm of the clasp but the details of construction may be varied without departing from the spirit of my invention, the scope of which is defined by the appended claims.

I claim:

1. A clasp device of the character described comprising an arm formed of sheet metal having integral portions folded to form a receptacle, said receptacle having perforations therein, and means for attaching said arm to a garment.

2. A clasp device of the character described comprising an arm formed of sheet metal having its longitudinal edges provided with integral flanges bent toward each other to form a receptacle, said flanges being perforated, and means for attaching said arm to a garment.

3. A clasp device of the character described comprising a narrow sheet metal arm, one face of which is provided with a receptacle having perforations, and means for attaching said arm to a garment.

In testimony whereof I affix my signature in presence of two witnesses.

THOMAS R. KILKENNY.

Witnesses:
HOWARD E. BARLOW,
A. F. MACREADY.

Copies of this patent may be obtained for five cents each, by addressing the "Commissioner of Patents, Washington, D. C."